(12) United States Patent
Nitzi et al.

(10) Patent No.: US 8,828,310 B2
(45) Date of Patent: Sep. 9, 2014

(54) FLOW CONTROL DEVICE

(75) Inventors: Gerald Nitzi, Bocholt (DE); Tim Hedley, Perthshire (GB); Joseph McGuire, Stirlingshire (GB); John Stevenson, Staffordshire (GA)

(73) Assignee: Refractory Intellectual Property GmbH & Co KG, Vienna (AT)

( * ) Notice: Subject to any disclaimer, the term of this patent is extended or adjusted under 35 U.S.C. 154(b) by 115 days.

(21) Appl. No.: 12/998,687

(22) PCT Filed: Jan. 7, 2010

(86) PCT No.: PCT/GB2010/000015
§ 371 (c)(1),
(2), (4) Date: Jul. 13, 2011

(87) PCT Pub. No.: WO2010/082015
PCT Pub. Date: Jul. 22, 2010

(65) Prior Publication Data
US 2011/0260092 A1    Oct. 27, 2011

(30) Foreign Application Priority Data
Jan. 16, 2009 (EP) .................................. 09250109

(51) Int. Cl.
C21C 7/00 (2006.01)
G05D 7/01 (2006.01)
B22D 41/16 (2006.01)
B22D 41/18 (2006.01)

(52) U.S. Cl.
CPC *G05D 7/01* (2013.01); *B22D 41/16* (2013.01); *B22D 41/186* (2013.01)
USPC .................... 266/217; 222/603; 222/602

(58) Field of Classification Search
USPC .................. 266/217, 236; 222/603, 602
See application file for complete search history.

(56) References Cited

U.S. PATENT DOCUMENTS 3,770,387 A * 11/1973 Loomba .................... 422/166
3,951,147 A    4/1976 Tucker et al.
(Continued)

FOREIGN PATENT DOCUMENTS

| CN | 1514755 A | 6/2001 |
|---|---|---|
| DE | 10 2005 029033 | 12/2006 |

(Continued)

OTHER PUBLICATIONS

International Search Report for PCT/GB2010/000015, dated Mar. 4, 2010.
(Continued)

Primary Examiner — Scott Kastler
(74) Attorney, Agent, or Firm — Nixon & Vanderhye, P.C.

(57) ABSTRACT

A stopper rod having an elongate trunk with an upstream first end and a downstream second end, a continuous axial bore extending through the trunk from a stopper inlet in the upstream first end to a stopper outlet in the downstream second end, and a flow control device disposed within the bore to create a backpressure upstream thereof. The flow control device includes a body having an inlet, an outlet and a passageway therebetween, a wire positioned substantially axially in the passageway, and a retainer for maintaining the wire in the passageway. In one embodiment, the retainer is constituted by a portion of the wire itself, which is bent or crimped or configured as a loop; kink or spiral which prevents the wire from being dislodged from the passageway.

18 Claims, 3 Drawing Sheets

(56) References Cited

U.S. PATENT DOCUMENTS

| | | | |
|---|---|---|---|
| 4,106,527 A * | 8/1978 | Schmidt | 138/131 |
| 5,157,251 A | 10/1992 | Albrecht et al. | |
| 6,035,726 A | 3/2000 | Bernard et al. | |
| 6,726,664 B2 | 4/2004 | Yaron et al. | |
| 7,198,181 B2 * | 4/2007 | Richard et al. | 222/602 |

FOREIGN PATENT DOCUMENTS

| | | |
|---|---|---|
| JP | 61061009 A * | 3/1986 |
| WO | WO 02/100579 | 12/2002 |
| WO | WO 02/100579 A1 | 12/2002 |

OTHER PUBLICATIONS

English Translation of Chinese Office Action issued in corresponding Application No. 2010800046344, 10 pgs, dated Nov. 5, 2012.

European Search Report, Application No. 09250109.7-2206, dated Jun. 19, 2009 (7 pgs).

European Search Report, Application No. 09250109.7-2206, dated Jun. 18, 2010 (5 pgs).

Letter dated Jul. 16, 2012 in corresponding Mexican Patent Application No. MX/a/2011/005328 (3 pgs); Mexican Office Action dated May 31, 2012 (2 pgs).

* cited by examiner

FLOW CONTROL DEVICE

This application is the U.S. national phase of International Application No. PCT/GB2010/000015 filed 7 Jan. 2010 which designated the U.S. and claims priority to EP Patent Application No. 09250109.7 filed 16 Jan. 2009, the entire contents of each of which are hereby incorporated by reference.

FIELD OF THE INVENTION

This invention relates to a flow control device. Particularly, but not exclusively, the invention relates to a flow control device for use in a gas supply channel such as those employed in industrial processes, for example, in a continuous casting steel-making process.

BACKGROUND TO THE INVENTION

In a continuous casting steel-making process, molten steel is poured from a ladle into a large holding vessel known as a tundish. The tundish has one or more outlets through which the molten steel flows into one or more respective moulds. The molten steel cools and begins to solidify in the moulds to form continuously cast solid lengths of metal. A submerged entry nozzle is located between each tundish outlet and each mould, and guides molten steel flowing through it from the tundish to the mould. A stopper rod is often employed to control the flow rate of the molten steel through the submerged entry nozzle.

The stopper rod generally comprises an elongate body having a rounded nose at one end thereof. In use, the rod is orientated vertically along its axis and is disposed with its nose adjacent the throat of the submerged entry nozzle such that raising and lowering of the stopper rod opens and closes the inlet of the submerged entry nozzle and thereby controls the flow of metal therethrough. The nose of the stopper rod is sized to completely close the inlet of the submerged entry nozzle when lowered to a seated position within the throat of the submerged entry nozzle.

A particular problem associated with the casting of molten metal is that inclusions (e.g. alumina) are often present in the molten metal as it is flowed from the tundish to the mould. Such inclusions tend to deposit on the stopper rod nose or within the submerged entry nozzle depending upon the flow conditions within the casting channel. Accordingly, over time the build up of inclusions can affect the geometry of the components to such an extent that the flow control characteristics of the system are altered and the continuous casting sequence may have to be interrupted.

The injection of a stream of inert gas, such as argon, into the flow of molten metal helps to float out inclusions (especially alumina) and inhibits the build up of such inclusions, which can result in the clogging of parts of the system. The gas may be introduced in a number of ways, for example, through the central axis of a stopper rod to exit through a discharge port in the nose of the stopper rod, or through a porous plug located in the base of a tundish or in the bore of a submerged entry nozzle. Often, due to the venturi effect, molten metal flowing past the point of introduction of the gas creates a negative pressure which can be transmitted back into the gas supply, potentially sucking air into the metal through the stopper rod or through the gas supply pipework if joints are not airtight. To date, this problem has been addressed by providing a restrictor in the gas supply channel, e.g. in the nose of the stopper rod. The restrictor may be provided by a simple narrowing of the bore or it may be constituted by a plug with a narrow bore therethrough (or a porous plug). The restrictor creates a backpressure and results in a positive internal pressure upstream of the restrictor. This positive internal pressure inhibits air ingress into the gas supply channel thereby reducing the quantity of contaminants in the metal being cast.

It will be understood that all references to pressure are relative to atmospheric pressure so that negative pressures relate to pressures below atmospheric pressure and positive pressures relate to pressures above atmospheric pressure.

A disadvantage of using a typical restrictor such as that described above, in a stopper rod, is that over time an increase in internal pressure can arise which can result in the stopper rod cracking or even being blown apart. Moreover, the required backpressure, coupled with a desired relatively low flow rate, dictates that the bore of the restrictor be small (e.g. 1 mm in diameter) and very accurately formed (i.e. with a low tolerance level). However, currently it is difficult to produce accurately dimensioned narrow bore refractories of such small diameters.

It is therefore an aim of the present invention to provide a flow control device that addresses the afore-mentioned problems.

It is also an aim of the present invention to provide a flow control device that can address similar problems in other systems where fluid is transported along a conduit.

SUMMARY OF THE INVENTION

According to a first aspect of the present invention there is provided a flow control device comprising a body having an inlet, an outlet and a passageway therebetween; a wire positioned in the passageway; and a retaining means for maintaining the wire in the passageway.

The flow control device of the present invention is advantageous because it allows the flow rate (and resulting backpressure) to be controlled by the size of the wire located within the body since the wire effectively reduces the dimensions of the at least one passageway. Thus, the body can more easily and cheaply be manufactured with a passageway having dimensions greater than would normally be required, and to higher degree of accuracy, to create a particular backpressure. Consequently, the problems associated with manufacturing devices with passageways having precise, small diameters are rendered moot. Furthermore, wires of very precise diameters are readily available, for example, from a company called Kanthal.

It will be understood that, for any given bore, the size of the wire can be chosen to provide the desired backpressure and flow rate to suit a particular application.

A typical flow control device employed in a known stopper rod might include a cylindrical passageway with a 1 mm² cross-sectional area and a diameter of approximately 1.14 mm. A similar 'free' cross-sectional area (i.e. that provided by the passageway for fluid to flow therethrough when a wire is positioned in the device) can be achieved by using a body having a cylindrical passageway 5 mm in diameter and placing a cylindrical wire of 4.88 mm diameter into the passageway to leave an annular channel of approximately 0.06 mm thickness. It might be thought that such a small width of channel would be prone to blockages. However, the Applicants have discovered that, in certain embodiments, the flow of gas tends to agitate the wire and this is believed to cause a self-cleaning effect to reduce the risk of blockages.

The Applicants have also discovered that, since there is a greater surface area for the gas to flow past in the present invention (i.e. the surface area of the large diameter passageway plus the surface area of the wire), the gas experiences a greater frictional force through the flow control device. Consequently, embodiments of the present invention may not require the same free cross-sectional area as in an equivalent wire-free flow control device. Rather, the effect of the increased frictional force may allow for larger free cross-sectional areas, to provide the same backpressure and flow rate, thereby further reducing the risk of blockages.

In relation to the use of flow control devices in stopper rods, the Applicants have postulated that out-gassing from the immersed (hot) portion of the stopper rod may introduce a number of additional chemical species into the axial bore. The Applicants have also determined that a typical alumina restrictor positioned adjacent the nose of a stopper rod could experience an adiabatic cooling effect of approximately 260° C. (the temperature drop being a function of the gas temperature in the region of the restrictor, the temperature in the nose being approximately 1560° C.): the adiabatic expansion of gas within the restrictor cools the gas significantly, which in turn cools the restrictor itself. Accordingly, the Applicants have postulated that blockages, which appear to occur in typical restrictors, may be caused by gaseous materials (i.e. the reaction products of the out-gassed species) condensing and forming deposits within the restrictor, thereby restricting the flow of gas therethrough and resulting in an increase in backpressure, which can cause the stopper rod to crack or be blown apart. It should be noted, however, that on examination of failed stopper rods there are sometimes no traces of blockages in the restrictors and the Applicants believe that this is because the temperature in the bore rises once the gas stops flowing therethrough and so any deposits are evaporated before they can be detected. The Applicants believe that embodiments of the present invention can help to reduce the risk of blockages caused by the above-described deposition of species during adiabatic temperature reduction since movement of the wire (for example, due to turbulence in the flow) can serve to inhibit the build up of deposits in the passageway.

Notwithstanding the above, the flow control device of the present invention may be useful in any system involving the transport of a fluid where a positive backpressure is desirable to inhibit air ingress into the system (e.g. through joints in the fluid supply path).

The wire may be made from a variety of materials (not necessarily metal) although it will be understood that the material will be chosen to have the desired properties for the application in question. For example, when the flow control device is for use in a stopper rod, the wire will be chosen from a material which can withstand the temperatures it will experience (e.g. up to 1560° C.). Thus, the wire may be constituted from a metal or metal alloy (e.g. Steel, Molybdenum or Tungsten), a ceramic, refractory, cermet or other materials. It will be understood that the thermal expansion of the wire during use may need to be taken into account when the material and dimensions of the wire are being selected.

Two or more wires may be employed in a single passageway or they may each be disposed in separate (multiple) passageways. The two or more wires may be coupled together.

The wire may have a cross-section of any desired shape (e.g. round, elliptical, square, rectangular or other polygonal shape).

The dimensions and/or cross-sectional shape of the wire may vary along its length.

The wire may be positioned solely within the passageway or it may extend out of the inlet and/or the outlet.

The portion of the wire disposed within the passageway may comprise one or more sections which are linear, kinked or spiral. The portion of the wire disposed within the passageway may extend over the full length of the passageway or a portion thereof.

In certain embodiments the wire may be hollow. Fluid may be permitted to flow through the wire to effectively increase the free cross-sectional area of the device.

Where a single passageway is provided it may be co-axial with the axis of the body. Where a plurality of passageways is provided (each preferably having its own inlet and outlet) they may be distributed evenly around the axis of the body. The (or each) passageway may be parallel to or inclined to the axis of the body.

The cross-sectional shape of each passageway is not particularly limited and each may independently be, for example, circular, elliptical, square, rectangular or another polygonal shape. The passageway may have a cross-sectional shape which is different to that of the wire. Furthermore, the cross-sectional shape of each passageway may vary along its length and the cross-sectional area of each passageway may increase, decrease or remain constant along its length.

The passageway may comprise two or more sections of differing dimensions. In one embodiment, the passageway comprises a first upstream section of a first cross-sectional area and a second downstream section of a second cross-sectional area, wherein the first cross-sectional area is smaller than the second cross-sectional area. Thus, the inlet may be narrower than the outlet and the passageway may comprise a stepped bore. It will be understood that the section with the smallest cross-sectional area will determine the flow rate through the device, with the maximum flow rate being determined in the usual manner by the so-called sonic velocity.

In a particular embodiment the body is made from non-porous material such as a refractory or metal. Alternatively, the body may be made from a porous material such as a foam or a partially sintered solid.

The retaining means may be constituted by an anchoring mechanism, such as a screw, weld or adhesive, which secures the wire to the body. Alternatively, the retaining means may be constituted by a portion of the wire itself. For example, a portion of the wire may be bent or crimped or it may be configured as a loop, kink or spiral which prevents the wire from being dislodged from the passageway. The retaining means may be provided above, below or within the passageway.

In embodiments of the present invention, the retaining means permits relative movement of the wire within the passageway. This movement can be generated by the turbulence of the flow passing through the device and this may act as a self-cleaning or scrubbing mechanism to help prevent the build up of contaminants on the surface of the body and/or the wire.

In some embodiments, the retaining means may be configured to vibrate or oscillate the wire. Thus, the retaining means may be configured as a spring.

In certain embodiments the flow control device may be configured as a so-called control bore for use in a stopper rod.

According to a second aspect of the present invention there is provided a flow control system comprising a conduit for the transport of fluid therethrough and a flow control device according to the first aspect of the present invention, disposed within the conduit to create a backpressure therein.

According to a third aspect of the present invention there is provided a stopper rod comprising an elongate trunk having an upstream first end and a downstream second end; a continuous axial bore extending through the trunk from a stopper inlet in the upstream first end to a stopper outlet in the downstream second end; and a flow control device according to the first aspect of the present invention, disposed within the bore to create a backpressure upstream thereof.

The flow control device may be disposed at any position within the bore to provide the desired effect. As described in detail in the Applicants co-pending European patent application number EP07254572.6 and its equivalents, relocating the device from adjacent the downstream second end of the stopper rod to a position where the inlet of the body is closer to the first end than the second end (e.g. to a position close to the slag line) also helps to reduce the risk of blockages in the device. This is because the temperatures experienced at that position will be lower than at the second end and therefore there is less chance of chemical depositions, which arise from the out-gassed species cooling and condensing as they pass through the device, since these species are not present when the gas passes through the body.

In relation to the third aspect of the present invention, a gas supply conduit may be arranged to supply gas into the axial bore at the stopper inlet or at a position between the stopper inlet and the flow control device.

The axial length of the flow control device (i.e. the distance between the inlet and the outlet) may be less than 10% and typically between about 2 and 5% of the length of the stopper rod (i.e. the distance between the first end and the second end).

The outlet of the flow control device is preferably spaced from the second end of the stopper rod. It will be understood that, in use, the pressure drops across the flow control device from the inlet to the outlet. Once the gas emerges from the outlet of the flow control device it will expand creating a low-pressure region. This low-pressure will remain substantially constant to the second end of the stopper rod. Thus, in the case where the flow control device is relatively short and is positioned in the upper half of the stopper rod, the majority of the immersed portion of the stopper rod will not be exposed to overpressure (i.e. positive pressure) and so mechanical stress on the immersed portion is reduced (this is particularly advantageous when a two-part stopper rod is employed having a separate nose part affixed at the lower end of the stopper rod or more usually a compressed nose/body assembly). Moreover, as the flow control device is exposed to less heat when in the upper half of the stopper rod, it can be made from a wider variety of materials. It will also be noted that the low-pressure region (i.e. the outlet of the flow control device) should be below the surface of the molten metal in the tundish (when in use) to avoid air ingress through the porous walls of the stopper rod.

The internal shape of the stopper rod may constitute the body of the flow control device or the body may be a separate component in the form of a plug inserted within the axial bore.

It will be understood that the longer the flow control device, the greater the degree of variation permitted in the position of the stopper rod relative to the surface of molten metal in the tundish to allow the outlet of the flow control device to be below the top of the slag layer, when in use (i.e. to ensure that positive pressure is provided at all points above the slag layer so that air ingress is prevented). However, an increase in the length of the flow control device will result in an increase in backpressure. Furthermore, decreasing the free cross-sectional area of the passageway(s) will also result in an increase in backpressure. Consequently, the length of the flow control device and the free cross-sectional area of the passageway(s) should be carefully chosen to achieve the desired backpressure.

Stopper rods are generally mounted by a fixing rod secured within the axial bore of the stopper rod. The gas supply conduit may be constituted by a passage through the fixing rod. Alternatively, the gas supply conduit may be an additional bore or bores extending from the outer surface of the stopper rod to the axial bore.

In a certain embodiment, the stopper rod trunk is provided with a rounded or frusto-conical nose at the second end. The trunk may be formed in one-piece or may comprise an elongate tubular part co-pressed with a nose part.

According to a fourth aspect of the present invention there is provided a kit of parts for constructing a flow control device according to the first aspect of the present invention, the kit of parts comprising at least one body having an inlet, an outlet and a passageway therebetween; at least one wire locatable in the passageway; and at least one retaining means operable to maintain the at least one wire in the passageway.

A range of wires of different dimensions may be provided for use with a single body.

In any of the above aspects of the present invention, the flow control device may be employed to control the flow of an inert gas such as argon. Alternatively, the flow control device may be employed to control the flow of a liquid or other gas.

An alternative solution conceived by the present Applicants to the problem of blockages in standard flow control devices (i.e. ones not including a wire according to the present invention), is to ensure that the body of the device has a higher thermal conductivity than normal, e.g. of at least 70 W/mK. A traditional device comprises approximately 99% alumina and has a thermal conductivity of approximately 35 W/mK. Increasing the thermal conductivity of the device will ensure that the body remains at a higher temperature, when in use, which consequently reduces the likelihood of chemical depositions (arising from the out-gassed species cooling and condensing as they pass through the body) from causing blockages.

BRIEF DESCRIPTION OF THE DRAWINGS

Embodiments of the present invention will now be described, by way of examples only, with reference to the accompanying drawings, in which.

DETAILED DESCRIPTION OF CERTAIN EMBODIMENTS

Figure 1A:
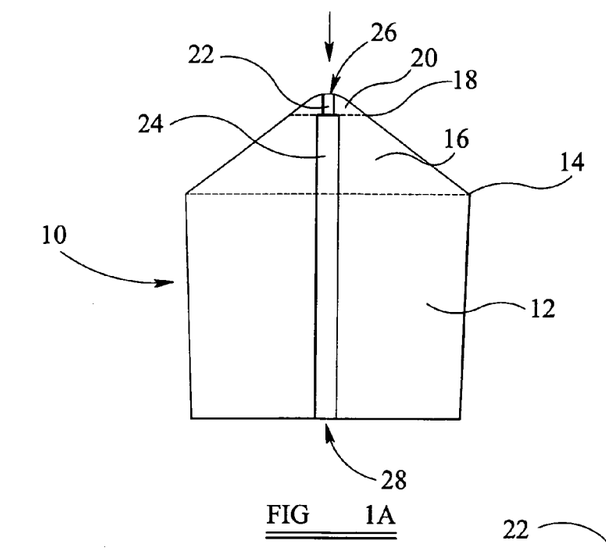
FIG. 1A shows a side cross-sectional view of a known flow control device for use in a stopper rod.
Figure 2:
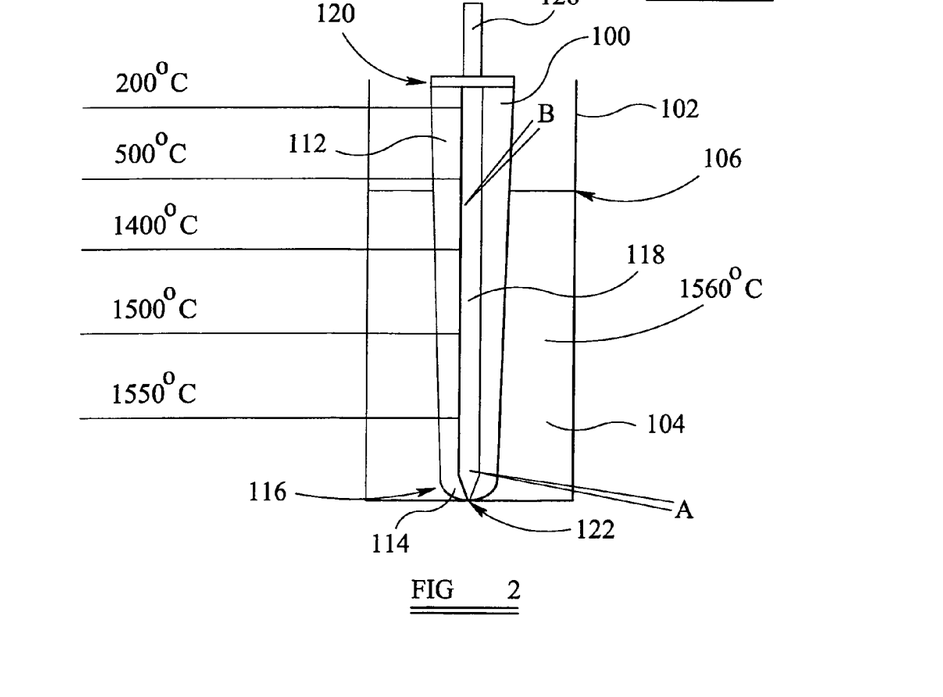
FIG. 2 illustrates the temperature variance of gas flowing along a known stopper rod when positioned in a tundish containing molten metal to an operating depth, and indicates two possible positions for the flow control device of FIG. 1A.

FIG. 1A shows a side cross-sectional view of a known flow control device 10 for use in a stopper rod 100 such as that shown in FIG. 2. The flow control device 10 comprises a frusto-conical body 12 that tapers slightly outwardly towards an upper end 14 of the body 12. At the upper end 14 a further frusto-conical section 16 is provided which tapers inwardly at approximately 45° to the horizontal. The frusto-conical section 16 has an upper terminating plane 18 of approximately a quarter the width of the upper end 14. A shallow rounded tip 20 extends upwardly from the plane 18. A narrow (1 mm diameter) cylindrical bore 22 is provided vertically through the centre of the tip 20. In the plane 18 the bore 22 is stepped to form a larger (3 mm diameter) cylindrical bore 24 that extends through the centre of the frusto-conical section 16 and the body 12. Accordingly, in this embodiment, an inlet 26 is provided at the upper end of the narrow bore 22 and an outlet 28 is provided at the lower end of the larger bore 24.

Figure 1B:
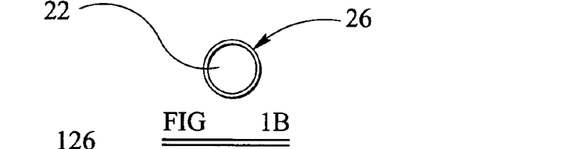
FIG. 1B illustrates an enlarged view of the cross-sectional area at the inlet to the flow control device of FIG. 1A.

An enlarged view of the cross-sectional area of the bore 22, at the inlet 26 to the flow control device 10, is shown in FIG. 1B.

FIG. 2 illustrates the gas temperature variance along a typical stopper rod 100 when positioned in a tundish 102 containing molten steel 104 to an operating depth 106 (i.e. to a certain height above the floor of the tundish 102). The stopper rod 100 comprises an elongate tubular part 112 with a co-pressed rounded nose part 114 at its lower (second) end 116. A continuous axial bore 118 is provided from the upper (first) end 120 of the tubular part 112 to a tip 122 of the nose 114. The bore 118 has a substantially constant circular cross-section along the length of the tubular part 112 and tapers inwardly in the nose 114. The stopper rod 100 is held in a vertical position in the tundish 102 by a fixing rod 126. The stopper rod 100 is approximately the same length as the height of the tundish 102. As can be seen, the surface of the molten steel 104, at its operating depth 106, is approximately 70% of the way up the stopper rod 100 from its lower end 116 (and approximately 70% of the way up the tundish 102).

In use, the temperature of the molten steel 104 in the tundish 102 is approximately 1560° C. However, the temperature of the inner surface of the bore 118 of the stopper rod 100 (and hence the temperature of the gas within the axial bore 118 of the stopper rod 100) varies along its length. Thus, adjacent the upper end 120 of the stopper rod 100 the temperature of the gas is approximately 200° C. and at a position just above the operating level 106 of the molten steel 104 in the tundish 102 the temperature is approximately 500° C. Down approximately a quarter of the depth of the molten steel 104, the temperature of the gas is approximately 1400° C., at approximately halfway down the depth of the molten steel 104, the temperature is approximately 1500° C., and at approximately three-quarters of the way down the depth of the molten steel 104, the temperature is approximately 1550° C.

Typically, a flow control device 10 such as that shown in FIG. 1A, will be positioned adjacent the nose 114 of the stopper rod 100 (i.e. at position 'A' in FIG. 2). However, the Applicants have found that, in such a system, the gas flowing through the axial bore 118 experiences a sudden temperature drop adjacent the stopper rod nose 114 which can cause condensation of the materials produced during a preceding out-gassing phase (when the temperature of the stopper rod 100 is between approximately 900 and 1400° C.) and subsequent blockage of the flow control device 10. It is therefore an aim of the present invention to try to address this problem. However, it should be noted that aspects of the present invention are not limited to flow control devices employed in the nose 114 of the stopper rod 100 but that flow control devices according to the present invention may advantageously be disposed in other positions in the stopper rod 100 (e.g. at the operating (slag) level 106 of the molten steel 104—marked position 'B' in FIG. 2) or, indeed, in other flow control systems.

Although not wishing to be bound by theory, the Applicants believe that the following chemical reactions may occur as a result of out-gassing in the stopper rod 100. At above 983° C. carbon monoxide is formed (equation 1). The carbon monoxide then reacts with silicon to form silica (equation 2). In addition, magnesium oxide may react with carbon to form magnesium and carbon monoxide (equation 3). Forsterite may then be formed from magnesium and silica (equations 4 and 5).

Equation 1

Equation 2

Equation 3

Equation 4

Equation 5

Some or all of the above reactions may be the cause of chemical deposits that can block traditional flow control devices 10 in use. However, as will be explained below, it is believed that embodiments of the present invention overcome this problem.

Figures 3A, 3B, 4:
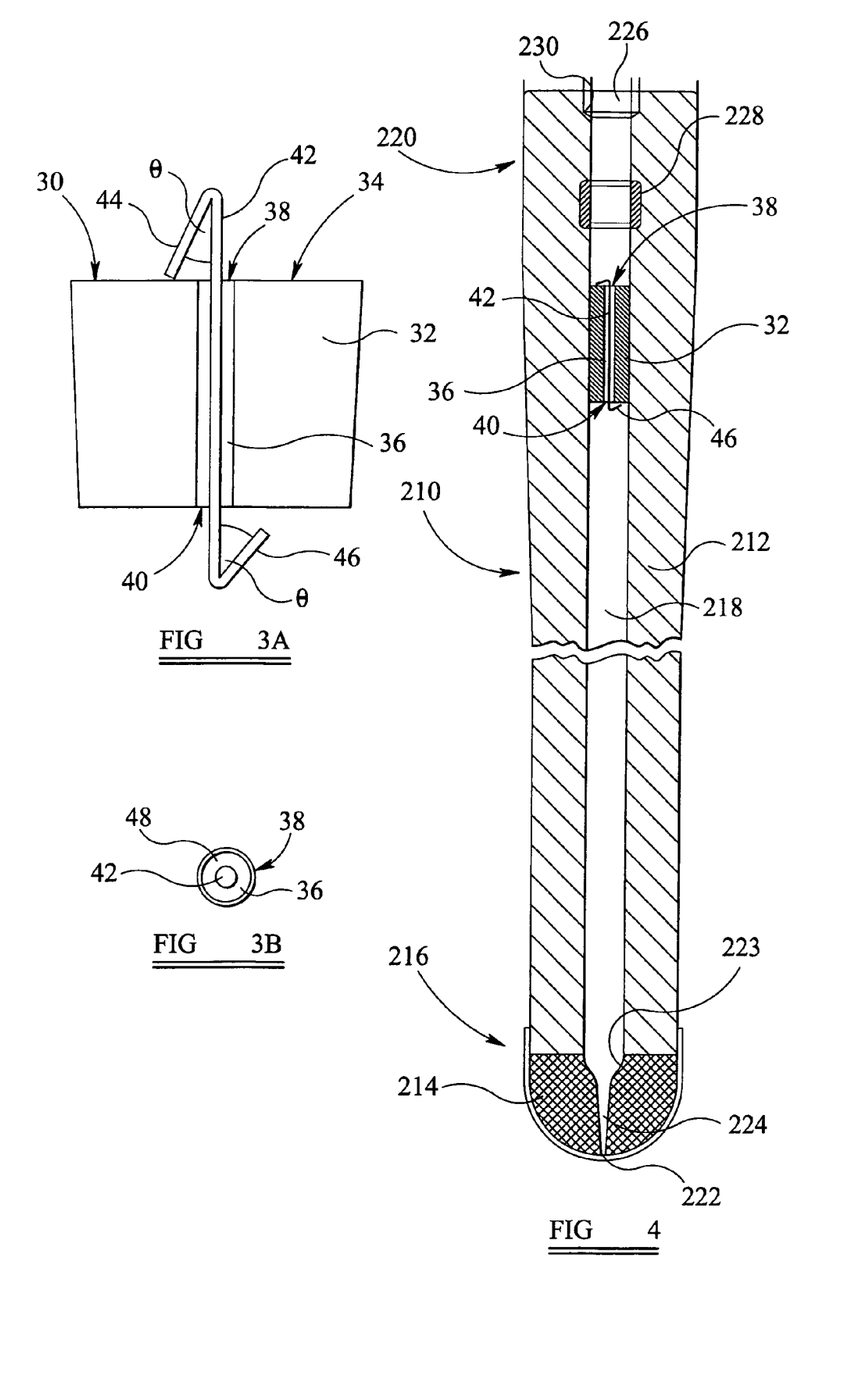
FIG. 3A shows a side cross-sectional view of a flow control device according to a first embodiment of the present invention, employing a single wire.
FIG. 3B illustrates an enlarged view of the cross-sectional area at the inlet to the flow control device of FIG. 3A.
FIG. 4 shows a cross-sectional view along the longitudinal axis of a stopper rod incorporating the flow control device of FIG. 3A.

FIG. 3A shows a side cross-sectional view of a flow control device 30 according to a first embodiment of the present invention. The flow control device 30 comprises a frusto-conical body 32 that tapers slightly outwardly towards an upper end 34 of the body 32. A 5 mm diameter cylindrical passageway 36 is provided vertically through the axis of the body 32. An inlet 38 is provided at the upper end of the passageway 36 and an outlet 40 is provided at the lower end of the passageway 36. A substantially straight wire 42 having a circular cross-section and a diameter of 3 mm is positioned in the centre of the passageway 36 and extends beyond the inlet 38 and outlet 40. An upper end 44 of the wire 42 is bent towards the body 32 to form an angle θ of approximately 45° to the vertical while a lower end 46 of the wire 42 is bent in the opposite direction towards the body 32, also to form an angle θ of approximately 45° to the vertical. Accordingly, in this embodiment, the bent upper and lower ends 44, 46 of the wire 42 serve as retaining means to prevent the wire from dislodging from the passageway 36.

An enlarged view of the cross-sectional area of the passageway 36 and wire 42, at the inlet 38 to the flow control device 30, is shown in FIG. 3B. Thus, it can be seen that the wire 42 limits the cross-sectional area of the passageway 36 to a narrow annulus 48.

As the size of the wire 42 alters the effective cross-sectional area of the passageway 36, embodiments of the present invention can be employed as flow control devices where a small, precise throughbore is required to give rise to a desired flow rate and backpressure, without having to manufacture the small throughbore directly in the device itself. This simplifies the manufacturing process for the device, thereby speeding up production and potentially reducing costs. In addition, the wire 42 is disposed in the flow control device 30 such that it can move within the passageway 36 under the influence of flow through the device 30. This movement can help to inhibit species in the flow from depositing on the device 30 and causing blockages therein.

With reference to FIG. 4, there is illustrated a stopper rod 210 according to an embodiment of the present invention. The stopper rod 210 has an elongate tubular part 212 with a rounded nose part 214 at its lower (second) end 216, formed by co-pressing the two parts. A continuous axial bore 218 is provided from the upper (first) end 220 of the tubular part 212 to a tip 222 of the nose 214. The axial bore 218 has a substantially constant circular cross-section along the length of the tubular part 212. In the upper portion of the nose 214, the sidewall 223 of the bore 218 curves inwardly before forming a gently inwardly tapering frusto-conical spout 224 which exits at the tip 222. Typically, the bore 218 at the exit from the tip 222 has a diameter of approximately 3 mm to 5 mm.

The upper end 220 of the tubular part 212 is configured to receive a fixing rod 226 when in use. Thus, towards the upper end 220, a threaded ceramic insert 228 is provided in the sidewall of the bore 218 for engagement with the end of the fixing rod 226. Upstream of the ceramic insert 228 a gasket 230 is provided between the fixing rod 226 and the tubular part 212 to produce an airtight seal therebetween. The fixing rod 226 has a bore through which argon gas can be fed into the axial bore 218 of the stopper rod 210 and therefore in this embodiment the fixing rod 226 serves as the gas supply conduit. In addition, a free end of the fixing rod 226 is attached to a support mechanism (not shown) configured for controlling the height and position of the stopper rod 210, in use.

The flow control device 30 of FIG. 3A is provided in the bore 218 approximately one quarter of the way down the stopper rod 210 from the upper end 220. The body 32 of the flow control device 30 is arranged to seal against the bore 218 so as to force the gas flowing through the bore 218 to flow through the passageway 36. In the embodiment shown, the flow control device 30 has a length (i.e. distance between the inlet 38 and the outlet 40) of approximately 35 mm, which corresponds to approximately 3.5% of the length of the stopper rod 210.

It will be understood that, in use, flow control device 30 causes an increased resistance to flow through the axial bore 218 and this results in an increase in pressure upstream of the inlet 38 (i.e. backpressure). A predetermined amount of backpressure can be provided by carefully choosing the size of the passageway 36 and wire 42 (i.e. length and cross-sectional area) and the flow rate of gas (e.g. argon) through the axial bore 218. In a particular embodiment, it is desirable to make the pressure upstream of the flow control device 30 positive (i.e. equal to or greater than atmospheric pressure) and the pressure downstream of the flow control device 30 negative since this arrangement inhibits air ingress above the flow control device 30 and reduces the mechanical stress due to high pressure below the flow control device 30.

Further embodiments of the present invention are illustrated in FIGS. 5A through 7B. In each of these embodiments, a flow control device 50, 60, 70 is shown which is similar to that shown in FIGS. 3A and 4 and so like reference numerals will be used where appropriate. Rather than employing a single central passageway 36, each of the flow control devices 50, 60 and 70 employ two parallel passageways 36' equally spaced from the centre of the body 32.

Figure 5A:
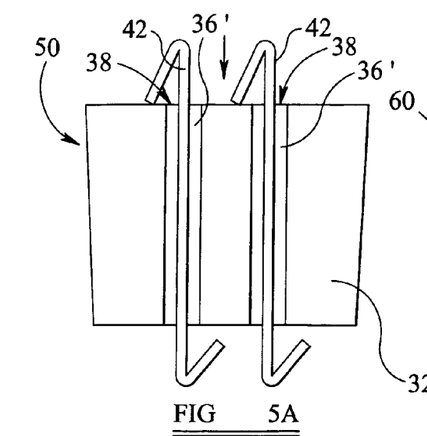
FIG. 5A shows a side cross-sectional view of a flow control device according to a second embodiment of the present invention, employing two individual wires.
Figures 5B, 6B, 7A:
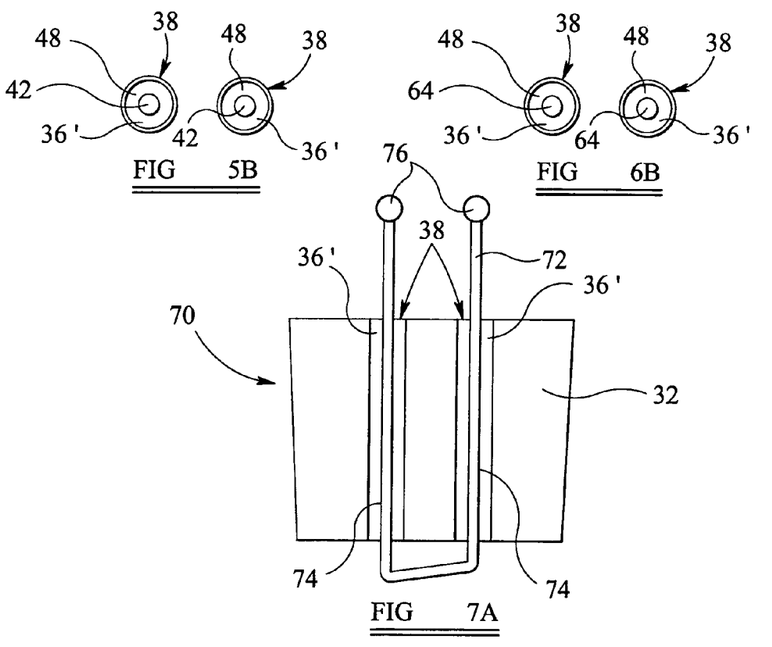
FIG. 5B illustrates an enlarged view of the cross-sectional areas at the inlets to the flow control device of FIG. 5A.
FIG. 6B illustrates an enlarged view of the cross-sectional areas at the inlets to the flow control device of FIG. 6A.
FIG. 7A shows a side cross-sectional view of a flow control device according to a forth embodiment of the present invention, employing two wires coupled to form a U-shape.

In FIGS. 5A and 5B two wires 42 (identical to the wire 42 in the flow control device 30) are provided. Each wire 42 is disposed, respectively, in one of the two passageways 36'.

Figure 6A:
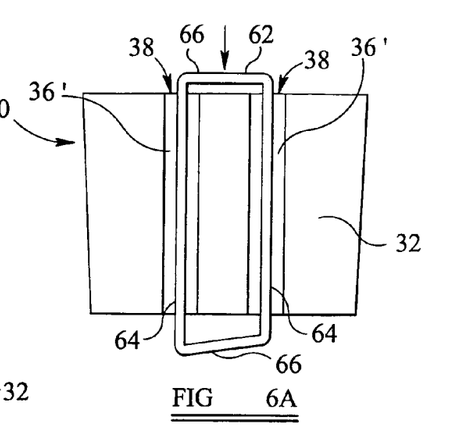
FIG. 6A shows a side cross-sectional view of a flow control device according to a third embodiment of the present invention, employing two wires coupled to form a loop.

In FIGS. 6A and 6B a wire formed into a rectangular loop 62 is positioned with each of its long sides 64 disposed, respectively, in one of the two passageways 36'. Thus, in this embodiment, the two short sides 66 of the loop 62 serve as the retaining means to hold the long sides 64 in the passageways 36'.

Figure 7B:
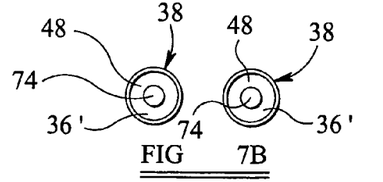
FIG. 7B illustrates an enlarged view of the cross-sectional areas at the inlets to the flow control device of FIG. 7A.

FIGS. 7A and 7B illustrate an embodiment where a wire is formed into a U-shape 72. As above, each of the long sides 74 of the U-shape 72 is disposed, respectively, in one of the two passageways 36'. In this embodiment, the two free ends of the U-shape 72 are provided with circular lobes 76 which serve to prevent the long sides 74 from being extracted from the passageways 36' in a first direction; the short side 78 of the U-shape 72 serving to prevent the long sides 74 from being extracted from the passageways 36' in a second direction.

As can be seen from FIGS. 5B, 6B and 7B, the cross-sectional areas of the passageways 36' and wires 42, 64, 74, at the respective inlets 38 to the flow control devices 50, 60 and 70 are identical to that shown in FIG. 3B in relation to the flow control device 30. Thus, it can be seen that each of the wires 42, 64, 74 limits the cross-sectional area of the passageways 36' to a narrow annulus 48.

It will be appreciated by persons skilled in the art that various modifications may be made to the above-described embodiments without departing from the scope of the present invention. For example, whilst the above discussion has been primarily concerned with flow control devices for use in stopper rods used in tundishes, aspects of the invention are equally applicable to flow control devices used in other applications.

The invention claimed is:

1. A stopper rod comprising:
   an elongate trunk having an upstream first end and a downstream second end;
   a continuos axial bore extending through the trunk from a stopper inlet in the upstream first end to a stopper outlet in the downstream second end; and
   a flow control device disposed within the bore to create a backpressure upstream thereof, said flow control device comprising:
   a body having an inlet, an outlet and a passageway therebetween;
   a wire positioned substantially axially in the passageway; and
   a retaining means for maintaining the wire in the passageway;
   wherein the retaining means is constituted by a portion of the wire itself, which is bent or crimped or configured as a loop; kink or spiral which prevents the wire from being dislodged from the passageway.

2. A stopper rod comprising:
   an elongate trunk having an upstream first end and a downstream second end;
   a continuous axial bore extending through the trunk from a stopper inlet in the upstream first end to a stopper outlet in the downstream second end; and
   a flow control device disposed within the bore to create a backpressure upstream thereof, said flow control device comprising:
   a body having an inlet, an outlet and a passageway therebetween;
   a wire positioned substantially axially in the passageway such that a space exists between an inner wall of the body and an outer wall of the wire; and a retaining means for maintaining the wire in the passageway;

wherein the retaining means permits sufficient relative movement of the wire within the passageway to dislodge any precipitation in said space.

3. The stopper rod according to claim 1 wherein the wire comprises one or more of a metal, a metal alloy, a ceramic, a refractory, or a cermet.

4. The stopper rod according to claim 1 wherein two or more wires are employed.

5. The stopper rod according to claim 1 wherein two or more passageways are provided, each having an inlet and an outlet.

6. The stopper rod according to claim 4 wherein the two or more wires are each disposed in separate passageways.

7. The stopper rod according to claim 4 wherein the two or more wires are coupled together.

8. The stopper rod according to claim 1 wherein the wire is hollow.

9. The stopper rod according to claim 2 wherein the retaining means is constituted by a portion of the wire itself.

10. The stopper rod according to claim 1 wherein the retaining means permits relative movement of the wire within the passageway.

11. The stopper rod according to claim 1 wherein the retaining means is configured as a spring.

12. The stopper rod according to claim 2 wherein the wire comprises one or more of a metal, a metal alloy, a ceramic, a refractory, or a cermet.

13. The stopper rod according to claim 2 wherein two or more wires are employed.

14. The stopper rod according to claim 2 wherein two or more passageways are provided, each having an inlet and an outlet.

15. The stopper rod according to claim 13 wherein the two or more wires are each disposed in separate passageways.

16. The stopper rod according to claim 13 wherein the two or more wires are coupled together.

17. The stopper rod according to claim 2 wherein the wire is hollow.

18. The stopper rod according to claim 2 wherein the retaining means is configured as a spring.

\* \* \* \* \*